United States Patent
Song

(10) Patent No.: US 10,629,194 B2
(45) Date of Patent: Apr. 21, 2020

(54) SPEECH RECOGNITION METHOD AND DEVICE BASED ON ARTIFICIAL INTELLIGENCE

(71) Applicant: BAIDU ONLINE NETWORK TECHNOLOGY (BEIJING) CO., LTD., Beijing (CN)

(72) Inventor: Hui Song, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 85 days.

(21) Appl. No.: 15/857,811

(22) Filed: Dec. 29, 2017

(65) Prior Publication Data
US 2018/0330726 A1    Nov. 15, 2018

(30) Foreign Application Priority Data
May 15, 2017   (CN) .......................... 2017 1 0339663

(51) Int. Cl.
*G10L 21/0208*    (2013.01)
*G10L 25/18*    (2013.01)
(Continued)

(52) U.S. Cl.
CPC ............ *G10L 15/20* (2013.01); *G01S 3/8083* (2013.01); *G10L 25/84* (2013.01); *H04R 3/005* (2013.01);
(Continued)

(58) Field of Classification Search
USPC ...................................... 704/500; 381/17, 66
See application file for complete search history.

(56) References Cited

U.S. PATENT DOCUMENTS 4,720,865 A * 1/1988 Taguchi .................. G10L 19/10
704/216
5,027,410 A * 6/1991 Williamson ......... H04R 25/453
381/314
(Continued)

FOREIGN PATENT DOCUMENTS

CN    1753084    3/2006
CN    102499712    6/2012
(Continued)

OTHER PUBLICATIONS

Yoshioka, Takuya, and Tomohiro Nakatani. "Generalization of multi-channel linear prediction methods for blind MIMO impulse response shortening." IEEE Transactions on Audio, Speech, and Language Processing 20.10 : 2707-2720 (Year: 2012).*
(Continued)

*Primary Examiner* — Seong-Ah A Shin
(74) *Attorney, Agent, or Firm* — Hodgson Russ LLP

(57) ABSTRACT

The present disclosure provides a speech recognition method and device based on artificial intelligence. The method includes: collecting signals of an array of microphones to obtain a plurality of first speech signals; filtering out a reverberation signal in each first speech signal to obtain a plurality of second speech signals, and obtaining a third speech signal based on the plurality of second speech signals; performing noise extraction on each first speech signal based on the third speech signal to obtain a plurality of first noise signals; and filtering and adding the plurality of first noise signals to obtain a second noise signal, and subtracting the second noise signal from the third speech signal to obtain a target speech signal.

17 Claims, 4 Drawing Sheets

(51) Int. Cl.
*G10L 21/00* (2013.01)
*H04B 10/516* (2013.01)
*G10L 15/20* (2006.01)
*G10L 25/84* (2013.01)
*H04R 3/00* (2006.01)
*G01S 3/808* (2006.01)
*G10L 21/0232* (2013.01)
*G10L 21/0216* (2013.01)
*H04R 1/40* (2006.01)

(52) U.S. Cl.
CPC ............................. *G10L 21/0232* (2013.01); *G10L 2021/02082* (2013.01); *G10L 2021/02166* (2013.01); *H04R 1/406* (2013.01); *H04R 2430/25* (2013.01)

(56) References Cited

U.S. PATENT DOCUMENTS

| | | | | |
|---|---|---|---|---|
| 2004/0203458 | A1* | 10/2004 | Nigra | H04B 1/525 455/67.13 |
| 2009/0222261 | A1* | 9/2009 | Jung | G10L 19/20 704/219 |
| 2009/0271005 | A1* | 10/2009 | Christensen | G10L 21/00 700/19 |
| 2015/0016622 | A1* | 1/2015 | Togami | H04R 3/02 381/66 |
| 2015/0063818 | A1* | 3/2015 | Zhou | H04B 10/516 398/115 |
| 2015/0117649 | A1* | 4/2015 | Nesta | H04R 3/005 381/17 |
| 2016/0086618 | A1* | 3/2016 | Neoran | H04M 9/08 704/205 |
| 2018/0182410 | A1* | 6/2018 | Kaskari | G10L 25/18 |
| 2018/0240471 | A1* | 8/2018 | Markovich Golan | G10L 21/0208 |
| 2018/0308503 | A1* | 10/2018 | Kaskari | G10L 21/038 |

FOREIGN PATENT DOCUMENTS

| | | |
|---|---|---|
| CN | 103245941 | 8/2013 |
| CN | 104115223 | 10/2014 |
| CN | 104835503 | 8/2015 |
| CN | 105355210 | 2/2016 |
| CN | 105427860 | 3/2016 |
| CN | 106340305 | 1/2017 |

OTHER PUBLICATIONS

Habets, Emanuël AP, et al. "Joint dereverberation and residual echo suppression of speech signals in noisy environments." IEEE Transactions on Audio, Speech, and Language Processing 16.8 (2008): 1433-1451. (Year: 2008).*

Cohen et al., "Combined Weighted Prediction Error and Minimum Variance Distortionless Response for dereverberation," IEEE International Conference on Acoustics, Speech and Signal Processing (ICASSP), Mar. 2017, pp. 446-450.

Hu, "Research on Key Techniques of Radio Resource Allocation in Relay-Enhanced Cellular Networks," Master Thesis, University of Electronic Science and Technology of China, 2014, pp. 1-85.

SIPO, First Office Action for CN Application No. 201710339663.X, dated Dec. 18, 2019.

* cited by examiner

SPEECH RECOGNITION METHOD AND DEVICE BASED ON ARTIFICIAL INTELLIGENCE

This application is based on and claims priority to Chinese Patent Application No. 201710339663.X, filed on May 15, 2017, the entire contents of which are incorporated herein by reference.

FIELD

The present disclosure relates to a speech recognition technology field, and more particularly to a speech recognition method based on artificial intelligence and a speech recognition device based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce a new intelligent machine capable of acting in a same way as human intelligence. The researches in this field include robots, speech recognition, image recognition, natural language processing and expert systems, etc., in which one of most important aspects of AI is the speech recognition technology.

At present, mature speech recognition technologies are mostly applied in near-field environment, i.e., a situation in which a user is close to a microphone, and a recognition rate is relatively high. However, when the user is in a far-field environment, for example, the user is 3 meters, 5 meters or farther from the microphone, speech recognition performance of existing speech recognition models or systems may drop dramatically.

At present, a noise-adding training mode is mostly used, in which speech signals in a far-field scene are simulated, and an acoustic model is re-trained according to training data, such that the re-trained acoustic model is suitable for the far-field scene. However, this mode completely depends on the training data. Since the training data cannot cover all possibilities of interference factors such as noise, reverberation and the like, representation ability of this kind of model is limited, and speech recognition performance of this kind of model is also limited.

SUMMARY

Embodiments of the present disclosure seek to solve at least one of the problems existing in the related art to at least some extent.

Embodiments of a first aspect of the present disclosure provide a speech recognition method based on artificial intelligence, including: collecting signals of an array of microphones to obtain a plurality of first speech signals; filtering out a reverberation signal in each first speech signal to obtain a plurality of second speech signals, and obtaining a third speech signal based on the plurality of second speech signals; performing noise extraction on each first speech signal based on the third speech signal to obtain a plurality of first noise signals; and filtering and adding the plurality of first noise signals to obtain a second noise signal, and subtracting the second noise signal from the third speech signal to obtain a target speech signal.

Embodiments of a second aspect of the present disclosure provide a speech recognition device based on artificial intelligence, including a processor and a memory configured to store one or more software modules executable by the processor. The one or more software modules include: a collecting module, configured to collect signals of an array of microphones to obtain a plurality of first speech signals; a beam forming module, configured to filter out a reverberation signal in each first speech signal to obtain a plurality of second speech signals, and to obtain a third speech signal based on the plurality of second speech signals; an adaptive blocking matrix module, configured to receive the third speech signal and the plurality of first speech signals, and to perform noise extraction on each first speech signal based on the third speech signal to obtain a plurality of first noise signals; and an adaptive interference canceller module, configured to receive the third speech signal and the plurality of first noise signals, to filter and add the plurality of first noise signals to obtain a second noise signal, and to subtract the second noise signal from the third speech signal to obtain a target speech signal.

Embodiments of a third aspect of the present disclosure provide another speech recognition device based on artificial intelligence, including a memory and a processor. The processor is configured to run a program corresponding to executable program codes by reading the executable program codes stored in the memory, so as to perform the speech recognition method based on artificial intelligence according to embodiments of the first aspect of the present disclosure.

Embodiments of a fourth aspect of the present disclosure provide a non-transitory computer readable storage medium having a computer program stored thereon. When the computer program is executed by a processor, the speech recognition method based on artificial intelligence according to embodiments of the first aspect of the present disclosure is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
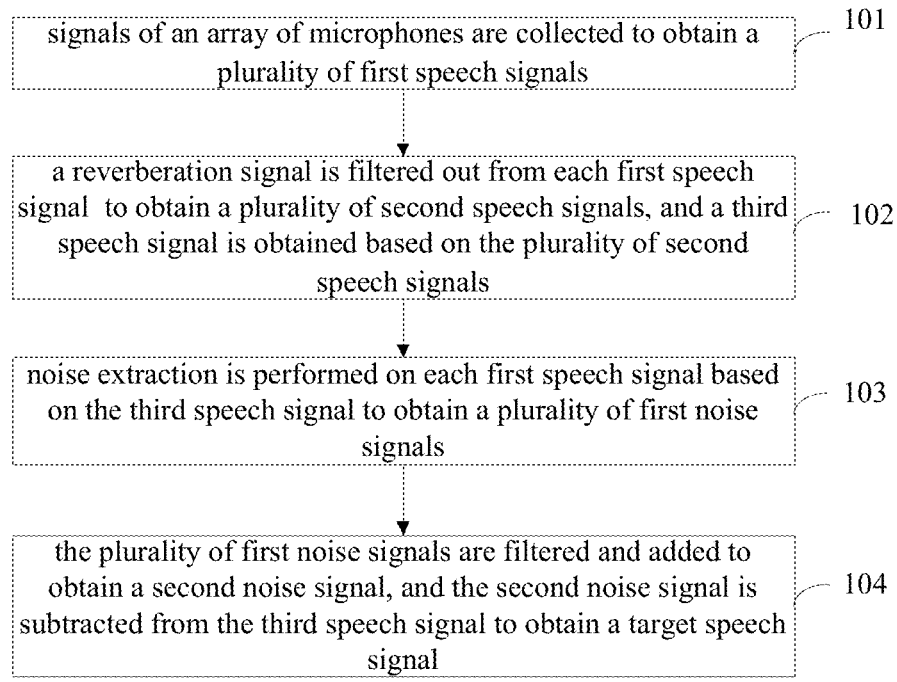
FIG. 1 is a flow chart of a speech recognition method based on artificial intelligence according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A speech recognition method and device based on artificial intelligence will be described below with reference to drawings.

At present, mature speech recognition technologies are mostly applied in near-field environment, i.e., a situation in which a user is close to a microphone, and a recognition rate is relatively high. However, when the user is in a far-field environment, for example, the user is 3 meters, 5 meters or farther from the microphone, speech recognition performance of existing speech recognition models or systems may drop dramatically.

At present, a noise-adding training mode is mostly used, in which speech signals in a far-field scene are simulated, and an acoustic model is re-trained according to training data, such that the re-trained acoustic model is suitable for the far-field scene. However, this mode does not do anything to the input signals, and completely depends on the training data. Since the training data can not cover all possibilities of interference factors such as noise, reverberation and the like, representation ability of this kind of model is limited, and speech recognition performance of this kind of model is also limited.

Accordingly, embodiments of the present disclosure provide a speech recognition method based on artificial intelligence, which may realize performing de-reverberation, enhancement, and de-noising processing on input signals for speech recognition, and solve the problem of low recognition rate in the far-field environment in the related art.

FIG. 1 is a flow chart of a speech recognition method based on artificial intelligence according to an embodiment of the present disclosure.

As illustrated in FIG. 1, the speech recognition method based on artificial intelligence includes followings.

At block 101, signals of an array of microphones are collected to obtain a plurality of first speech signals.

To enhance speech signals to be recognized, the array of microphones is adopted as a front-end input device in embodiments of the present disclosure. All microphones included in the array of microphones collect the speech signal sent from a sound source simultaneously, thus obtaining the plurality of first speech signals, i.e. first speech signals of a plurality of channels.

At block 102, a reverberation signal is filtered out from each first speech signal to obtain a plurality of second speech signals, and a third speech signal is obtained based on the plurality of second speech signals.

In a far-field speech recognition scene, i.e. when a user is far from the microphone when inputting speech, the reverberation is very serious. Therefore, in order to improve speech recognition rate, the reverberation needs to be suppressed to some extent.

In embodiments of the present disclosure, the reverberation signal in each first speech signal may be suppressed with a weighted prediction error (WPE for short) algorithm by using a linear predictive characteristic of the speech signal.

In embodiments of the present disclosure, a multi-channel speech input system is adopted, and therefore a multi-channel WPE algorithm may be used. That is, for a multi-channel input scene, a de-reverberation operation may be performed on each channel of first speech signal with the WPE algorithm, thus achieving a purpose of filtering out the reverberation signal in each first speech signal to obtain the plurality of second speech signals.

After the plurality of second speech signals are obtained, in order to further cancel residual reverberation signal and to enhance signal strength, the plurality of second speech signals may be filtered by a minimum variance distortionless response (MVDR for short) beam former to obtain the third speech signal.

At block 103, noise extraction is performed on each first speech signal based on the third speech signal to obtain a plurality of first noise signals.

In embodiments of the present disclosure, after the third speech signal is obtained, the third speech signal is input to an adaptive blocking matrix module. The adaptive blocking matrix module is configured to suppress speech component in the third speech signal by performing adaptive filtering on the third speech signal to reserve noise component, i.e. to extract noise in the third speech signal.

In embodiments of the present disclosure, the adaptive blocking matrix module provides an adaptive filter for each input first speech signal. The adaptive filter adopts overlap-save frequency domain filtering algorithm to filter the input signal. In the following, one first speech signal will be taken as an example to illustrate working mechanism of the adaptive blocking matrix module.

Supposing that data length of each process is L, in order to satisfy an operating condition of the overlap-save frequency-domain filtering algorithm, a first speech signal and a third speech signal with a length of 2L need to be established. The third speech signal may be denoted as a 2L×2L frequency-domain signal matrix, as defined in formula (1). In detail, L-dimensional data of the third speech signal at a preceding sampling time point and L-dimensional data of the third speech signal at a current sampling time point are used to establish the third speech signal with the length of 2L dimensions.

$$Y_f(k)=\mathrm{diag}\{F(y_f(kL-L), \ldots, y_f(kL), \ldots, y_f(kL+L-1))\} \quad (1)$$

where, $y_f(k)$ represents the third speech signal, F is a Fourier transformation matrix, a time-domain signal left-multiplying by F represents a Fourier transformation of the time-domain signal, i.e. the time-domain signal may be transformed into a frequency-domain signal. Similarly, a frequency-domain signal left-multiplying by $F^{-1}$ represents an inverse Fourier transformation of the frequency-domain signal, i.e. the frequency-domain signal may be transformed into a time-domain signal.

To realize frequency-domain adaptive filtering in the adaptive blocking matrix module, a 2L dimensional filter $H_b^{(m)}(k)$ may also be established, where m=0, 1, ..., M−1, M represents the number of the microphones in the array of microphones. That is, each microphone channel corresponds to a 2L dimensional filter.

The length of the adaptive filter is also 2L, in which, front L dimensions are normal filter coefficients, and last L dimensions are filled with zero, such that the frequency-domain adaptive filter having the length of 2L is established. The frequency-domain adaptive filter is expressed as formula (2).

$$H_b^{(m)}(k)=F(h_{b,0}^{(m)}(k),\ldots,h_{b,L-1}^{(m)}(k),0_{1\times L})^T \quad (2)$$

The process of the frequency-domain adaptive filtering may be expressed as a product of $Y_f(k)$ and $H_b^m(k)$, i.e., $Y_b^m(k)=Y_f(k)H_b^m(k)$.

Next, a noise signal (i.e. the first noise signal) in the first speech signal is extracted. The first noise signal may be calculated in the time domain or in the frequency domain.

In an embodiment of the present disclosure, a method for calculating the first noise signal in the time domain is provided, which may be as follows.

The third speech signal in the frequency domain (i.e. $Y_f(k)$) is input to the 2L dimensional filter in the adaptive blocking matrix module. The 2L dimensional filter may perform adaptive filtering on the third speech signal in the frequency-domain to obtain an output result of the frequency-domain adaptive filtering as $Y_b^m(k)=Y_f(k)H_b^m(k)$.

Since the third speech signal input to the adaptive blocking matrix module is a frequency-domain signal, the result of the adaptive filtering may be transformed into the time domain by left-multiplying by $F^{-1}$ to obtain $F^{-1}Y_f(k)H_b^m(k)$. The length of the transformed time-domain signal is still 2L. In the transformed time-domain signal, only last L data is valid, and front L data is invalid. That is, when the first noise signal is calculated, the second half of data needs to be reserved, and the first half of data may be discarded or set to zero. This may be realized by left-multiplying a w matrix with the transformed time-domain signal, where $w=\text{diag}[0_{1\times L},1_{1\times L}]$. Thus, a 2L dimensional time-domain signal $wF^{-1}Y_f(k)H_b^{(m)}(k)$ corresponding to the frequency-domain signal output by the adaptive filter is obtained. It should be noted that, after the w matrix is left-multiplied with the transformed time-domain signal, values of the first half of the obtained time-domain signal are all zero.

Since the front L data of the time-domain signal $wF^{-1}Y_f(k)H_b^{(m)}(k)$ corresponding to the frequency-domain signal output by the adaptive filter are all set to zero, the first speech signal is also expressed in a same form, i.e. as formula (3).

$$x_m(k)=(0_{1\times L},x_m(kL),\ldots,x_m(kL+L-1))^T \quad (3)$$

To ensure the whole adaptive filtering system to be a causal system, a time delay with a length τ may be performed on the first speech signal, obtaining a time-delayed first speech signal expressed as $x_m(k-\tau)$.

A difference between the time-delayed first speech signal and the output signal of the adaptive filter is the first noise signal, which is expressed as formula (4).

$$e_b^{(m)}(k)=x(k-\tau)-WF^{-1}Y_f(k)H_b^{(m)}(k) \quad (4)$$

In embodiments of the present disclosure, the third speech signal is taken as the input signal of the adaptive blocking matrix module, and the first speech signal is taken as a reference signal, such that the first noise signal of each channel is extracted.

In addition, since the first noise signal is the difference between the first speech signal and the output signal of the adaptive filter, i.e., an error signal of the adaptive filter, the adaptive filter may be updated according to the obtained first noise signal, to obtain an adaptive filter that may be applied to perform filtering on a third speech signal at a next sampling time point. Updating the adaptive filter in the frequency domain is expressed as formula (5).

$$H_b^{(m)}(k+1)=H_b^{(m)}(k)+\mu(k)Y_f^H(k)F_b^{(m)}(k) \quad (5)$$

where, the product of the first noise signal $e_b^{(m)}(k)$ and the third speech signal $Y_f^H(k)$ is an updating direction of the adaptive filter, $\mu(k)$ is a stepping matrix, configured to adjust a step length of each iteration of the adaptive filter. A general method for calculating the stepping matrix is: $\mu(k)=2\mu\times\text{diag}\{P_0^{-1}(k),\ldots,P_{2L-1}^{-1}(k)\}$ where, P(k) represents a power spectrum of the third speech signal $Y_f^H(k)$. The greater the energy of an input signal is, the smaller the iteration step length is.

At block 104, the plurality of first noise signals are filtered and added to obtain a second noise signal, and the second noise signal is subtracted from the third speech signal to obtain a target speech signal.

In an embodiment of the present disclosure, the third speech signal is also input to an adaptive interference canceller module. The adaptive interference canceller module is configured to cancel the noise in the third speech signal.

In embodiments of the present disclosure, an input signal of the adaptive interference canceller module is the output signal of the adaptive blocking matrix module. That is, each first noise signal is taken as an input signal. The third speech signal is taken as a reference signal. The adaptive interference canceller module provides an adaptive filter for each input first noise signal. The adaptive filter adopts overlap-save frequency domain filtering algorithm. In the following, working mechanism of the adaptive filter in the adaptive interference canceller module will be illustrated.

Firstly, an input signal of the adaptive interference canceller module is established. Fourier transformation is performed on the output signal $e_b^{(m)}(k)$ (i.e. the first noise signals) of the adaptive blocking matrix module, and thus the input signal of the adaptive interference canceller module, i.e., $E_b^{(m)}(k)=Fe_b^{(m)}(k)$ is obtained.

To satisfy a condition of the overlap-save filtering algorithm, an input signal with a length of 2L dimensions needs to be established, in which, front L dimensions are data of the first noise signal at a preceding sampling time point, and last L dimensions are data of the first noise signal at the current sampling time point. In an embodiment of the present disclosure, the input signal may be denoted as formula (6).

$$X_a^{(m)}(k)=\text{diag}\{E_b^{(m)}(k-1)_{lastL},E_b^{(m)}(k)_{lastL}\} \quad (6)$$

where, subscript lastL represents that only last L dimension data of the 2L dimensional vector is used. This is because that $E_b^{(m)}(k)$ is a 2L dimensional vector, data of the front L dimensions is set to zero, and only data of the last L dimensions is valid.

In another embodiment of the present disclosure, formula (6) has another presentation. Since data of the front L dimensions of the first noise signal is set to zero, and only data of the last L dimensions is valid, the input signal $X_a^{(m)}(k)$ may be established by a way as follows. Vector $e_b^{(m)}(k-1)$ is performed with circular shift with a length L, and then is added to $e_b^{(m)}(k)$, to obtain the input signal $X_a^{(m)}(k)$. This process may be denoted as formula (7).

$$X_a^m(k)=\text{diag}\{E_b^{(m)}(k)+JE_b^{(m)}(k-1)\} \quad (7)$$

where, $J=\text{diag}\{(1,-1,1,-1,\ldots,1,-1)_{1\times 2L}\}$. A frequency-domain signal left-multiplying by matrix J is equivalent to a time-domain signal corresponding to the frequency-domain signal completing the circular shift with the length L.

Then, the adaptive filtering process of the adaptive interference canceller module is performed. In detail, each first noise signal in the frequency domain is input to the adaptive filter corresponding to the adaptive interference canceller module for filtering, to obtain filter result of the adaptive filter. The adaptive filtering of the adaptive interference canceller module is different from the adaptive filtering of the adaptive blocking matrix module. The adaptive filtering of the adaptive interference canceller module only has one output, i.e. the second noise signal, while the adaptive filtering of the adaptive blocking matrix module has a plurality of outputs, whose number is same as the number of the microphones.

Therefore, in the adaptive interference canceller module, results of the adaptive filtering corresponding to respective channels need to be added to obtain the output signal of the adaptive filtering of the adaptive interference canceller module, i.e., the second noise signal. The second noise signal is denoted as formula (8).

$$Y_a^{(m)}(k) = \Sigma_{m=0}^{M-1} X_a^{(m)}(k) H_a^{(m)}(k) \tag{8}$$

To calculate the target speech signal, the second noise signal needs to be transformed into the time domain, and front L values in the transformed time-domain signal are set to zero, with only last L values reserved. The transformed second noise signal is denoted as formula (9).

$$y_a(k) = wF^{-1} \sum_{m=0}^{M-1} X_a^{(m)}(k) H_a^m(k) \tag{9}$$

For the reference signal, i.e. the third speech signal, it needs to be established as a 2L dimensional signal. In detail, the third speech signal with a length 2L is established as: data of front L dimensions being set to zero and data of last L dimensions being L dimensional data of the third speech signal at the current sampling time point. The third speech signal with the length 2L may be denoted as formula (10).

$$y_f(k) = (0_{1 \times L}, y_f(kL-\tau), \ldots, y_f(kL+L-1-\tau))^T \tag{10}$$

where, $\tau$ is a time delay item, configured to perform time delay on the reference signal, so as to ensure causality of the system.

Therefore, a difference obtained by subtracting the second noise signal transformed into the time domain from the third speech signal is the target speech signal. An expression of the target speech signal is as formula (11).

$$e_a(k) = y_f(k) - y_a(k) \tag{11}$$

The target speech signal is the difference between the third speech signal and the output signal of the adaptive filter, i.e. an error signal of the adaptive filter. Thereby, the adaptive filter may be updated with the obtained target speech signal, to obtain an adaptive filter that may be applied to perform filtering on the first noise signal at a next sampling time point. A formula for updating the adaptive filter is as formula (12).

$$H_a^{(m)}(k+1) = H_a^{(m)}(k) + \mu(k) X_a^{(m)}(k) Fe_a(k) \tag{12}$$

where, the product of the target speech signal in the frequency domain $Fe_a(k)$ and the input signal $X_a^{(m)}(k)$ is an updating direction of the adaptive filter, $\mu(k)$ is a stepping matrix, configured to adjust a step length of each iteration of the adaptive filter. A formula for calculating the stepping matrix is described in actions at block 104.

In embodiments of the present disclosure, in the adaptive interference canceller module, the plurality of first noise signals are filtered and added to obtain the second noise signal. The target speech signal may be obtained by subtracting the second noise signal from the third speech signal.

After the target speech signal is obtained, the target speech signal may be input to a far-field acoustic model for recognition, so as to obtain a speech recognition result. In detail, far-field speech data may be collected as training data for training the far-field acoustic model, such that the training data matches test data as much as possible, thus improving efficiency of the speech recognition.

The speech recognition method based on artificial intelligence according to embodiments of the present disclosure realizes performing de-reverberation, enhancement, and denoising processing on input signals for speech recognition, and solves the problem of low recognition rate in the far-field environment in the related art.

In the following, a process of processing the first speech signals with the WPE algorithm and the MVDR beam former to obtain the third speech signal in block 102 is described in detail with reference to FIG. 2.

Figure 2:
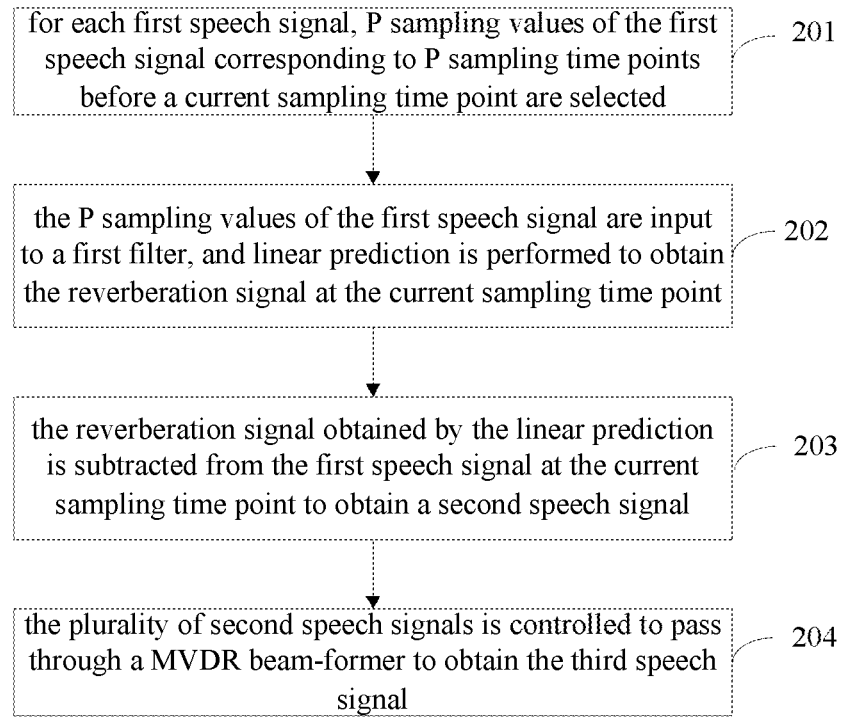
FIG. 2 is a flow chart of processing a speech signal based on a WPE algorithm and a MVDR beam former according to an embodiment of the present disclosure.

As illustrated in FIG. 2, the act at block 102 may include followings.

At block 201, for each first speech signal, P sampling values of the first speech signal corresponding to P sampling time points before a current sampling time point is selected.

In this embodiment, $P \geq 1$, and P is an integer.

When a linear predictive characteristic of speech signal is used to perform linear prediction for obtaining the reverberation signal, a direct prediction method may weaken a correlation of a speech signal itself, and bring serious damage to the speech signal itself. Therefore, in embodiments of the present disclosure, when the linear predictive characteristic is used, the values corresponding to the P sampling time points before the current sampling time point is not directly used to predict a value of the current sampling time point. Instead, for each of the P sampling time points before the current sampling point (a current sampling point), values corresponding to P sampling time points before the current sampling point are used to predict the value of the current sampling point.

In detail, a first sampling time point and a second sampling time point are determined. There are P sampling time points between the first sampling time point and the second sampling time point. The second sampling time point is close to the current sampling time point, and there are Q sampling time points between the second sampling time point and the current sampling time point. That is, Q sampling time points exist between the second sampling time point and the current sampling time point, such that a short-range correlation of the speech signal may be remained.

sampling values of the first speech signal are selected from the first sampling time point to the second sampling time point.

At block 202, the P sampling values of the first speech signal are input to a first filter, and linear prediction is performed to obtain the reverberation signal at the current sampling time point.

In embodiments of the present disclosure, supposing a coefficient of the first filter corresponding to the current time point is h(n), the P sampling values of the first speech signal is input to the first filter corresponding to the current time point, such that the reverberation signal at the current sampling time point may be linearly predicted. This process is denoted as formula (13).

$$y_l(n) = \sum_{k=-Q}^{-Q+P-1} h(k) y(n-k) \tag{13}$$

where, $y_l(n)$ is the predicted reverberation signal, $y(n)$ is the first speech signal at the current sampling time point.

At block 203, the reverberation signal obtained by the linear prediction is subtracted from the first speech signal at the current sampling time point to obtain a second speech signal.

The predicted reverberation signal $y_l(n)$ is subtracted from the first speech signal $y(n)$ at the current sampling time point, an obtained difference is the second speech signal $x(n)$, which is denoted as formula (14).

$$x(n)=y(n)-y_l(n) \qquad (14)$$

To obtain an optimal coefficient of the first filter, generally, the coefficient $h(n)$ of the first filter is iteratively calculated by minimizing mean square error and using a gradient descent method. This process is denoted as formula (15).

$$\min E\{x_{PE}(n)\}^2 = E\left|y(n) - \sum_{k=-Q}^{-Q+P-1} h(n-k)y(k)\right|^2 \qquad (15)$$

A premise of this method is that the input signal is a stationary signal. However, the speech signal is non-stationary, and thus this method may cause a large prediction error for a part of the speech signal having a high speech power and a small prediction error for a part of the speech signal having a low speech power. Therefore, the second speech signal may be weighted.

In detail, a speech power of the second speech signal at the current sampling time point is obtained. A weighted minimization processing is performed based on the speech power of the second speech signal at a preceding sampling time point and the speech power of the second speech signal at the current sampling time point. The weighted minimization processing is denoted as formula (16).

$$\min E\{x_{WPE}(n)\}^2 = \frac{E\left|y(n) - \sum_{k=-Q}^{-Q+P-1} h(n-k)y(k)\right|^2}{\sigma^2(h)} \qquad (16)$$

where, $\sigma^2(h)$ represents the speech power of the second speech signal.

It can be seen from formula (16) that, there are two variants $\sigma^2(h)$ and $h(n)$. In embodiments of the present disclosure, an auxiliary variant optimization method is used to optimize the two variants in two steps.

In the first step, in an $n^{th}$ iteration, the coefficient $h(n)$ of the first filter is fixed, and a speech power $\sigma^2(h)$ of the second speech signal at the $n^{th}$ iteration is obtained as formula (17).

$$\sigma^2(h) = E\left|y(n) - \sum_{k=-Q}^{-Q+P-1} h(n-k)y(k)\right|^2 \qquad (17)$$

In the second step, $\sigma^2(h)$ is fixed, and a problem of the minimization formula (15) is transformed to a standard mean square error minimization method, and an optimal estimate of $h(n)$ can be directly obtained, denoted as formula (18).

$$h(n) = R^{-1} r \qquad (18)$$

where, $R = \frac{\sum_{n=1}^{N} y(n)y^H(n)}{\sigma^2}$, $r = \frac{\sum_{n=1}^{N} y(n)y^*(n)}{\sigma^2}$, $y(n) = [y(n), y(n-1), \cdots, y(n-P+1)]^T$.

A filter coefficient of the first filter corresponding to a next sampling time point may be obtained based on a result of the weighted minimization processing.

At block 204, respective second speech signals are controlled to pass through a MVDR beam former to obtain one third speech signal.

In embodiments of the present disclosure, after de-reverberation is performed on the plurality of first speech signals using the WPE algorithm to obtain respective second speech signals, the plurality of second speech signals are controlled to pass through the MVDR beam former to further filter residual reverberation and noise and to obtain the third speech signal.

To improve filtering effect of the MVDR beam former, an optimal coefficient of the MVDR beam former may be determined before the second speech signals pass through the MVDR beam former.

In an embodiment, supposing that there is only one sound source in space. A direction vector of the sound source is determined first. In detail, a speech signal is collected from the sound source in a preset time period, and a first covariance matrix of the speech signal in the preset time period is obtained. A noise signal in the preset time period when the sound source is in a silent state is collected, and a noise covariance matrix of the noise signal is obtained. And then, a difference between the first covariance matrix and the noise covariance matrix is obtained as a second covariance matrix of the speech signal. The second covariance matrix is obtained by formula (19).

$$R_{ss}=R_{xx}-R_{nn} \qquad (19)$$

where, $R_{ss}$ is the second covariance matrix, $R_{xx}$ is the first covariance matrix, and $R_{nn}$ is the noise covariance matrix.

And then, eigenvalues of the second covariance matrix $R_{ss}$ are calculated. Since there is only one valid sound source in the space, there is one eigenvalue in the eigenvalues of the second covariance matrix $R_{ss}$ which is much larger than other eigenvalues. An eigenvector corresponding to this maximum eigenvalue is determined as the direction vector.

An optimal coefficient of the MVDR beam former is determined based on the direction vector of the sound source and a pre-estimated noise covariance matrix. The optimal coefficient of the MVDR beam former is expressed as formula (20).

$$w_{MVDR} = \frac{R_{nn}^{-1}a}{a^H R_{nn}^{-1}a} \qquad (20)$$

where, $R_{nn}$ is the noise covariance matrix, a is the direction vector of the sound source.

After the optimal coefficient of the MVDR beam former is determined, respective second speech signals are controlled to pass through the MVDR beam former for filter to obtain the third speech signal. This process is denoted as formula (21).

$$y_j(n)=w^H x \qquad (21)$$

In the related art, an orientation of the sound source is generally determined by a sound source positioning technology, so as to determine the direction vector. However, the sound source positioning itself may also cause error. Especially in a far-field situation, the positioning error is relatively large. Once the positioning direction is wrong, the output result of the MVDR beam former may be completely invalid. With the method for determining the direction vector provided in embodiments of the present disclosure, the error is small, and the problem that the output result of the MVDR beam former is completely invalid does not exist.

In embodiments of the present, de-reverberation and filtering are performed on the collected first speech signals by the WPE algorithm and the MVDR beam former, and thus it realizes that the reverberation in the speech signal is suppressed to some extent.

In the following, the speech recognition method based on artificial intelligence provided in embodiments of the present disclosure is described through a detailed implementation in combination with FIG. 3.

Speech acquisition is performed for the array of microphones containing M microphones, to obtain M first speech signals $x_0(k), x_1(k), \ldots, x_{M-1}(k)$.

Figure 3:
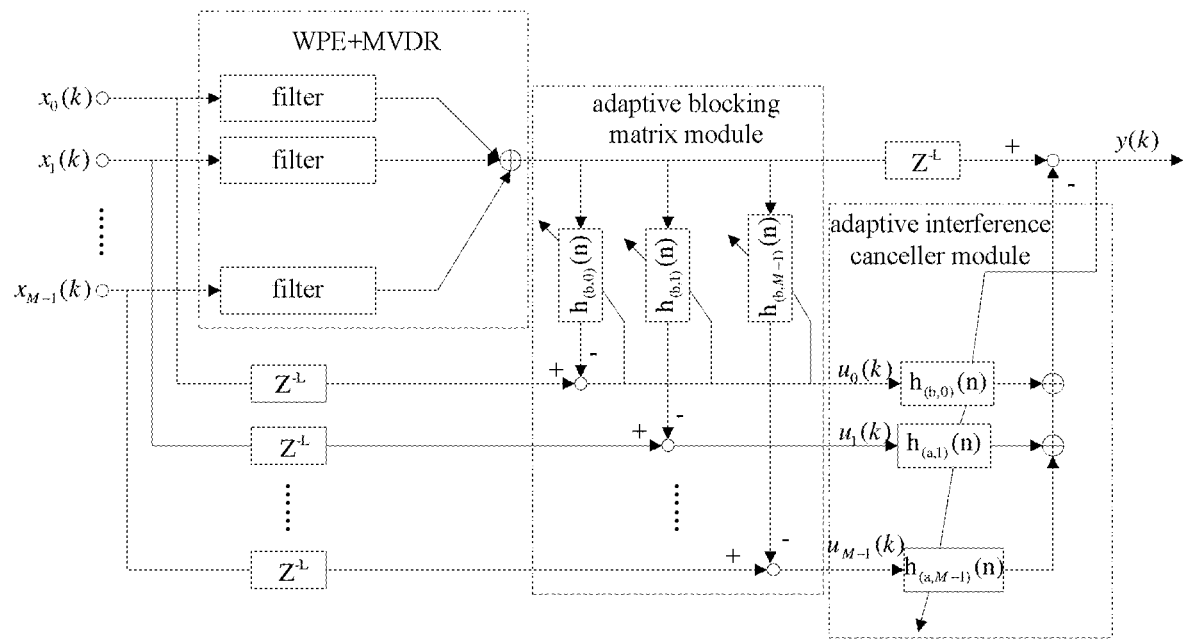
FIG. 3 is a schematic diagram illustrating a speech recognition method based on artificial intelligence according to an embodiment of the present disclosure.

As illustrated in FIG. 3, a fixed beam forming module is formed based on the WPE algorithm and the MVDR beam former. The fixed beam forming module performs processing such as de-reverberation, filtering, and the like on the M first speech signals $x_0(k), x_1(k), \ldots, x_{M-1}(k)$, to obtain one third speech signal.

The third speech signal is input to M filters $h_{(a,0)}(n), h_{(a,1)}(n), \ldots, h_{(a,M-1)}(n)$ respectively. That is, the adaptive blocking matrix module performs filtering on respective first speech signals and subtracts the filtered signal from a signal obtained by delaying corresponding first speech signal with $Z^{-L}$, to obtain M first noise signals $u_0(k), u_1(k), \ldots, u_{M-1}(k)$.

The M first noise signal $u_0(k), u_1(k), \ldots, u_{M-1}(k)$ are input to filters $h_{(a,0)}(n), h_{(a,1)}(n), \ldots, h_{(a,M-1)}(n)$ correspondingly to perform filtering processing. The filtered signals are added to obtain one second noise signal. And then, the second noise signal is subtracted from the delayed third speech signal to obtain the target speech signal $y(k)$.

After the target speech signal is obtained, the target speech signal is input to a far-field acoustic model for recognition, to obtain speech recognition result.

To realize above embodiments, the present disclosure further provides a speech recognition device based on artificial intelligence.

Figure 4:
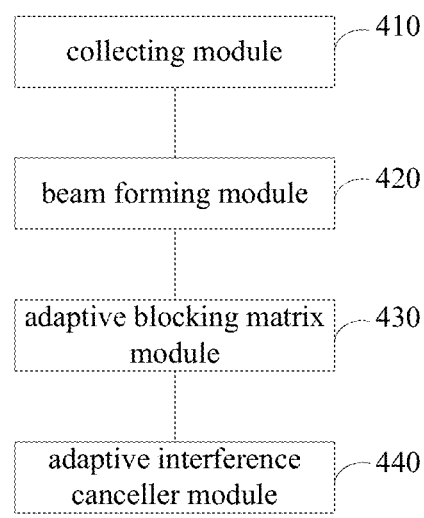
FIG. 4 is a block diagram of a speech recognition device based on artificial intelligence according to an embodiment of the present disclosure.

As illustrated in FIG. 4, the speech recognition device based on artificial intelligence includes a collecting module 410, a beam forming module 420, an adaptive blocking matrix module 430 and an adaptive interference canceller module 440.

The collecting module 410 is configured to collect signals of an array of microphones to obtain a plurality of first speech signals.

The beam forming module 420 is configured to filter out a reverberation signal in each first speech signal to obtain a plurality of second speech signals, to obtain a third speech signal based on the plurality of second speech signals, and to input the third speech signal to the adaptive blocking matrix module 430 and the adaptive interference canceller module 440 respectively.

The adaptive blocking matrix module 430 is configured to perform noise extraction on each first speech signal based on the third speech signal to obtain a plurality of first noise signals. The adaptive interference canceller module 440 is configured to filter and add the plurality of first noise signals to obtain a second noise signal, and to subtract the second noise signal from the third speech signal to obtain a target speech signal.

Figure 5:
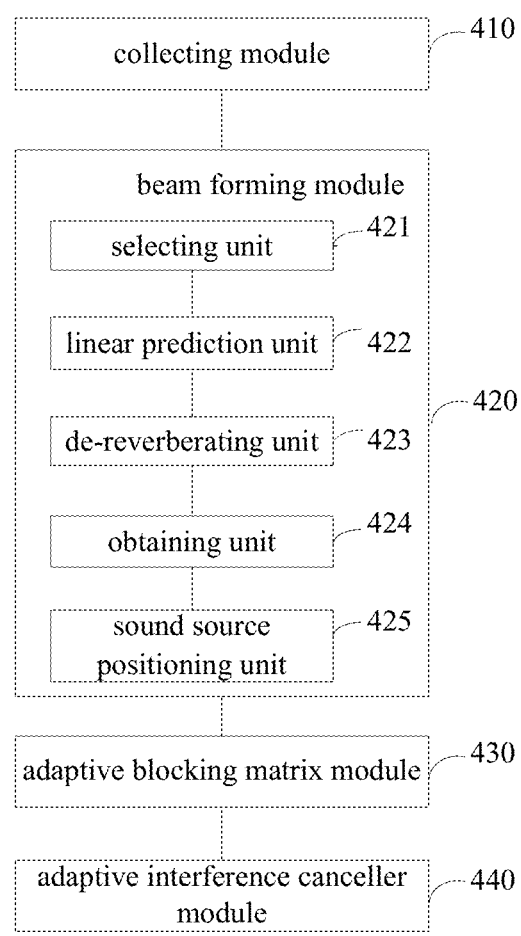
FIG. 5 is a block diagram of a speech recognition device based on artificial intelligence according to another embodiment of the present disclosure.

As illustrated in FIG. 5, the beam forming module includes: a selecting unit 421, a linear prediction unit 422, a de-reverberating unit 423, an obtaining unit 424, and a sound source positioning unit 425.

The selecting unit 421 is configured to, for each first speech signal, select P sampling values of the first speech signal corresponding to P sampling time points before a current sampling time point, where $P \geq 1$, and P is an integer.

The selecting unit 421 is configured to determine a first sampling time point and a second sampling time point, in which there are P sampling time points between the first sampling time point and the second sampling time point, the second sampling time point is close to the current sampling time point, and there are Q sampling time points between the second sampling time point and the current sampling time point; and to select the P sampling values of the first speech signal from the first sampling time point to the second sampling time point.

The linear prediction unit 422 is configured to input the P sampling values of the first speech signal to a first filter corresponding to the current time point, and to perform linear prediction to obtain the reverberation signal at the current sampling time point; and The de-reverberating unit 423 is configured to subtract the reverberation signal obtained by the linear prediction from the first speech signal at the current sampling time point to obtain a second speech signal.

The obtaining unit 424 is configured to obtain a speech power of the second speech signal at the current sampling time point, to perform a weighted minimization processing based on a speech power of the second speech signal at a preceding sampling time point and the speech power of the second speech signal at the current sampling time point, and to obtain a filter coefficient of the first filter corresponding to a next sampling time point based on a result of the weighted minimization processing.

The sound source positioning unit 425 is configured to, before controlling the plurality of second speech signals to pass through the MVDR beam former to obtain the third speech signal, determine a direction vector of a sound source, and to determine an optimal coefficient of the beam former based on the direction vector of the sound source and a pre-estimated noise covariance matrix.

The sound source positioning unit 425 is configured to: collect a first speech signal of the sound source in a preset time period; obtain a first covariance matrix of the first speech signals in the preset time period; collect a noise signal in the preset time period when the sound source is in a silent state; obtain a noise covariance matrix of the noise signal; obtain a second covariance matrix of speech signal based on the first covariance matrix and the noise covariance matrix; obtain eigenvalues of the second covariance matrix; and determine an eigenvector corresponding to a maximum of the eigenvalues as the direction vector.

Figure 6:
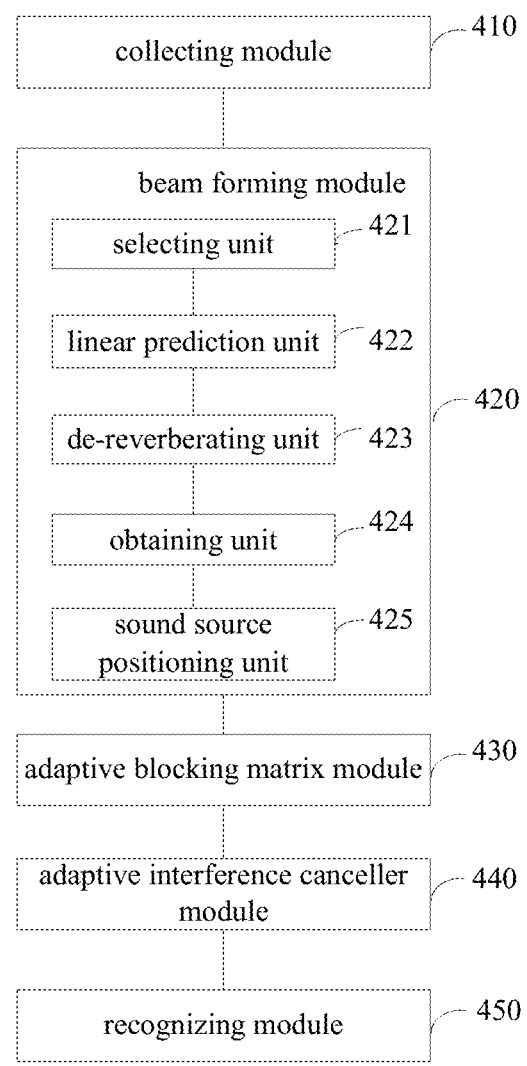
FIG. 6 is a block diagram of a speech recognition device based on artificial intelligence according to yet another embodiment of the present disclosure.

As illustrated in FIG. 6, based on FIG. 5, the speech recognition device based on artificial intelligence further includes a recognizing module 450.

The recognizing module 450 is configured to input the target speech signal to a far-field acoustic model for recognition.

It should be noted that, explanations and descriptions in the foregoing embodiments of the speech recognition method based on artificial intelligence are suitable for the embodiments of the speech recognition device based on artificial intelligence, which are not elaborated here.

The speech recognition device based on artificial intelligence according to embodiments of the present disclosure realizes performing de-reverberation, enhancement, and de-noising processing on input signals for speech recognition, and solves the problem of low recognition rate in the far-field environment in the related art.

To achieve the above objectives, embodiments of the present disclosure further provide a speech recognition device based on artificial intelligence. The device includes a memory and a processor. The processor is configured to, by reading executable program codes stored in the memory, run a program corresponding to the executable program codes, so as to perform the speech recognition method based on artificial intelligence according to above-mentioned embodiments of the first aspect of the present disclosure.

To achieve the above objectives, embodiments of the present disclosure further provide a computer program product. When instructions in the computer program product are executed by a processor, the speech recognition method based on artificial intelligence according to embodiments of the first aspect of the present disclosure is performed.

To achieve the above objectives, embodiments of the present disclosure further provide a non-transitory computer readable storage medium having a computer program stored thereon. When the computer program is executed by a processor, the speech recognition method based on artificial intelligence according to embodiments of the first aspect of the present disclosure is performed.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, such as two or three, unless specified otherwise.

Any process or method described herein in the flow chart or in other manners may be understood to represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A speech recognition method based on artificial intelligence, comprising:
   collecting signals of an array of microphones to obtain a plurality of first speech signals;
   filtering out a reverberation signal in each first speech signal to obtain a plurality of second speech signals, and obtaining a third speech signal based on the plurality of second speech signals;
   performing noise extraction on each first speech signal based on the third speech signal to obtain a plurality of first noise signals; and
   filtering and adding the plurality of first noise signals to obtain a second noise signal, and subtracting the second noise signal from the third speech signal to obtain a target speech signal;
   wherein the reverberation signal is filtered out from each first speech signal based on a WPE algorithm;
   wherein filtering out a reverberation signal in each first speech signal to obtain a plurality of second speech signals comprises:
      for each first speech signal, selecting P sampling values of the first speech signal corresponding to P sampling time points before a current sampling time point, where P≥1, and P is an integer;
      inputting the P sampling values of the first speech signal to a first filter, and performing linear prediction to obtain the reverberation signal at the current sampling time point; and
      subtracting the reverberation signal obtained by the linear prediction from the first speech signal at the current sampling time point to obtain the second speech signal;
   wherein selecting P sampling values of the first speech signal corresponding to P sampling time points before a current sampling time point comprises:
      determining a first sampling time point and a second sampling time point, wherein there are P sampling time points between the first sampling time point and the second sampling time point, the second sampling time point is close to the current sampling time point, and there are Q sampling time points between the second sampling time point and the current sampling time point; and
      selecting the P sampling values of the first speech signal from the first sampling time point to the second sampling time point.

2. The speech recognition method according to claim 1, wherein the third speech signal is obtained by controlling the plurality of second speech signals to pass through a MVDR beam former.

3. The speech recognition method according to claim 2, before controlling the plurality of second speech signal to pass through the MVDR beam former to obtain the third speech signal, further comprising:
   determining a direction vector of a sound source; and
   determining an optimal coefficient of the MVDR beam former based on the direction vector of the sound source and a pre-estimated noise covariance matrix.

4. The speech recognition method according to claim 3, wherein determining a direction vector of a sound source comprises:
   collecting a speech signal from the sound source in a preset time period;
   obtaining a first covariance matrix of the speech signal in the preset time period;
   collecting a noise signal in the preset time period when the sound source is in a silent state;
   obtaining a noise covariance matrix of the noise signal;
   obtaining a second covariance matrix of the speech signal based on the first covariance matrix and the noise covariance matrix;
   obtaining eigenvalues of the second covariance matrix; and
   determining an eigenvector corresponding to a maximum of the eigenvalues as the direction vector.

5. The speech recognition method according to claim 1, further comprising:
   inputting the target speech signal to a far-field acoustic model for speech recognition.

6. The speech recognition method according to claim 1, further comprising:
   obtaining a speech power of the second speech signal at the current sampling time point; and
   performing a weighted minimization processing based on a speech power of the second speech signal at a preceding sampling time point and the speech power of the second speech signal at the current sampling time point, and obtaining a filter coefficient of the first filter corresponding to a next sampling time point based on a result of the weighted minimization processing.

7. A speech recognition device based on artificial intelligence, comprising:
   a processor; and
   a memory, configured to store one or more software modules executable by the processor,
   wherein the one or more software modules comprise:
      a collecting module, configured to collect signals of an array of microphones to obtain a plurality of first speech signals;
      a beam forming module, configured to filter out a reverberation signal in each first speech signal to obtain a plurality of second speech signals, and to obtain a third speech signal based on the plurality of second speech signals;
      an adaptive blocking matrix module, configured to receive the third speech signal and the plurality of first speech signals, to perform noise extraction on each first speech signal based on the third speech signal to obtain a plurality of first noise signals; and
      an adaptive interference canceller module, configured to receive the third speech signal and the plurality of first noise signals, to filter and add the plurality of first noise signals to obtain a second noise signal, and to subtract the second noise signal from the third speech signal to obtain a target speech signal;
   wherein the beam forming module is configure to filter out the reverberation signal in each first speech signal based on a WPE algorithm;
   wherein the beam forming module comprises:
      a selecting unit, configured to, for each first speech signal, select P sampling values of the first speech signal corresponding to P sampling time points before a current sampling time point, where P≥1, and P is an integer;
      a linear prediction unit, configured to input the P sampling values of the first speech signal to a first filter, and to perform linear prediction to obtain the reverberation signal at the current sampling time point; and
      a de-reverberating unit, configured to subtract the reverberation signal obtained by the linear prediction from the first speech signal at the current sampling time point to obtain the second speech signal;

wherein the selecting unit is configured to:
determine a first sampling time point and a second sampling time point, wherein there are P sampling time points between the first sampling time point and the second sampling time point, the second sampling time point is close to the current sampling time point, and there are Q sampling time points between the second sampling time point and the current sampling time point; and
select the P sampling values of the first speech signal from the first sampling time point to the second sampling time point.

8. The speech recognition device according to claim 7, wherein the beam forming module is configured to control the plurality of second speech signals to pass through a MVDR beam former to obtain the third speech signal.

9. The speech recognition device according to claim 8, wherein the beam forming module further comprises:
a sound source positioning unit, configured to determine a direction vector of a sound source, and to determine an optimal coefficient of the MVDR beam former based on the direction vector of the sound source and a pre-estimated noise covariance matrix.

10. The speech recognition device according to claim 9, wherein the sound source positioning unit is configured to:
collect a speech signal from the sound source in a preset time period;
obtain a first covariance matrix of the speech signal in the preset time period;
collect a noise signal in the preset time period when the sound source is in a silent state;
obtain a noise covariance matrix of the noise signal;
obtain a second covariance matrix of the speech signal based on the first covariance matrix and the noise covariance matrix;
obtain eigenvalues of the second covariance matrix; and
determine an eigenvector corresponding to a maximum of the eigenvalues as the direction vector.

11. The speech recognition device according to claim 7, further comprising:
a recognizing module, configured to input the target speech signal to a far-field acoustic model for recognition.

12. The speech recognition device according to claim 7, wherein the beam forming module further comprises:
an obtaining unit, configured to obtain a speech power of the second speech signal at the current sampling time point, to perform a weighted minimization processing based on a speech power of the second speech signal at a preceding sampling time point and the speech power of the second speech signal at the current sampling time point, and to obtain a filter coefficient of the first filter corresponding to a next sampling time point based on a result of the weighted minimization processing.

13. A non-transitory computer readable storage medium, having a computer program stored thereon that, when executed by a processor, perform a speech recognition method based on artificial intelligence, the speech recognition method comprising:
collecting signals of an array of microphones to obtain a plurality of first speech signals;
filtering out a reverberation signal in each first speech signal to obtain a plurality of second speech signals, and obtaining a third speech signal based on the plurality of second speech signals;
performing noise extraction on each first speech signal based on the third speech signal to obtain a plurality of first noise signals; and
filtering and adding the plurality of first noise signals to obtain a second noise signal, and subtracting the second noise signal from the third speech signal to obtain a target speech signal;
wherein the reverberation signal is filtered out from each first speech signal based on a WPE algorithm;
wherein filtering out a reverberation signal in each first speech signal to obtain a plurality of second speech signals comprises:
for each first speech signal, selecting P sampling values of the first speech signal corresponding to P sampling time points before a current sampling time point, where $P \geq 1$, and P is an integer;
inputting the P sampling values of the first speech signal to a first filter, and performing linear prediction to obtain the reverberation signal at the current sampling time point; and
subtracting the reverberation signal obtained by the linear prediction from the first speech signal at the current sampling time point to obtain the second speech signal;
wherein selecting P sampling values of the first speech signal corresponding to P sampling time points before a current sampling time point comprises:
determining a first sampling time point and a second sampling time point, wherein there are P sampling time points between the first sampling time point and the second sampling time point, the second sampling time point is close to the current sampling time point, and there are Q sampling time points between the second sampling time point and the current sampling time point; and
selecting the P sampling values of the first speech signal from the first sampling time point to the second sampling time point.

14. The storage medium of claim 13, wherein the speech recognition method further comprises:
obtaining a speech power of the second speech signal at the current sampling time point; and
performing a weighted minimization processing based on a speech power of the second speech signal at a preceding sampling time point and the speech power of the second speech signal at the current sampling time point, and obtaining a filter coefficient of the first filter corresponding to a next sampling time point based on a result of the weighted minimization processing.

15. The storage medium of claim 13, wherein the third speech signal is obtained by controlling the plurality of second speech signals to pass through a MVDR beam former.

16. The storage medium of claim 15, wherein before controlling the plurality of second speech signal to pass through the MVDR beam former to obtain the third speech signal, the speech recognition method further comprises:
determining a direction vector of a sound source; and
determining an optimal coefficient of the MVDR beam former based on the direction vector of the sound source and a pre-estimated noise covariance matrix.

17. The storage medium of claim 16, wherein determining a direction vector of a sound source comprises:
collecting a speech signal from the sound source in a preset time period;
obtaining a first covariance matrix of the speech signal in the preset time period;

collecting a noise signal in the preset time period when the sound source is in a silent state;

obtaining a noise covariance matrix of the noise signal;

obtaining a second covariance matrix of the speech signal based on the first covariance matrix and the noise covariance matrix;

obtaining eigenvalues of the second covariance matrix; and determining an eigenvector corresponding to a maximum of the eigenvalues as the direction vector.

* * * * *